(12) United States Patent
Schneider et al.

(10) Patent No.: US 7,810,834 B2
(45) Date of Patent: Oct. 12, 2010

(54) APPARATUS AND SYSTEM FOR AN EXPANDABLE TRAILER

(76) Inventors: Stacy L. Schneider, 1960 Mahre, Park City, UT (US) 84098; Michael D. Schneider, 1960 Mahre, Park City, UT (US) 84098

( * ) Notice: Subject to any disclaimer, the term of this patent is extended or adjusted under 35 U.S.C. 154(b) by 1132 days.

(21) Appl. No.: 11/421,621

(22) Filed: Jun. 1, 2006

(65) Prior Publication Data

US 2007/0278766 A1    Dec. 6, 2007

(51) Int. Cl.
*B62B 1/00*    (2006.01)
(52) U.S. Cl. .................................... 280/656
(58) Field of Classification Search .............. 280/79.11, 280/491.1, 656; 180/209
See application file for complete search history.

(56) References Cited

U.S. PATENT DOCUMENTS

| | | | | |
|---|---|---|---|---|
| 2,461,577 | A | 2/1949 | Stark, Jr. ........................ 296/27 |
| 3,116,085 | A | 12/1963 | Uttley ........................... 296/26 |
| 3,315,973 | A | 4/1967 | Marple ......................... 280/34 |
| 4,126,324 | A | 11/1978 | Browning .................... 280/42 |
| 4,362,316 | A | 12/1982 | Wright ........................ 280/656 |
| 4,685,855 | A | 8/1987 | Celli ........................... 414/482 |
| 4,746,142 | A | 5/1988 | Davis .......................... 280/656 |
| 4,758,008 | A | 7/1988 | Moddejonge ................ 280/37 |
| 4,768,806 | A | 9/1988 | Tetreault ..................... 280/656 |
| 4,772,038 | A * | 9/1988 | MacDonald ................. 280/401 |
| 4,786,073 | A | 11/1988 | Harper ........................ 280/656 |
| 4,796,909 | A | 1/1989 | Kirkendall ................... 280/651 |
| 5,249,823 | A * | 10/1993 | McCoy et al. ................ 280/656 |
| 5,560,444 | A | 10/1996 | Tiedge ........................ 180/209 |
| 6,474,672 | B1 * | 11/2002 | Briscese .................. 280/414.5 |
| 6,511,092 | B1 | 1/2003 | Chepa ......................... 280/656 |
| 6,962,370 | B2 | 11/2005 | Simpson ..................... 280/789 |
| 2003/0155748 | A1 * | 8/2003 | Picard et al. ................. 280/656 |
| 2003/0197352 | A1 | 10/2003 | Bordeleau et al. ........... 280/656 |
| 2004/0061313 | A1 * | 4/2004 | Courtney ..................... 280/656 |
| 2004/0245805 | A1 | 12/2004 | Jaeck ....................... 296/182.1 |
| 2005/0093273 | A1 | 5/2005 | McDonell .................... 280/656 |
| 2005/0184485 | A1 | 8/2005 | Timmermans .............. 280/656 |
| 2006/0181063 | A1 * | 8/2006 | Eddings ....................... 280/656 |

* cited by examiner

*Primary Examiner*—Christopher P Schwartz
(74) *Attorney, Agent, or Firm*—Kunzler Needham Massey & Thorpe

(57) ABSTRACT

An apparatus and system are disclosed for an expandable trailer. The apparatus, in one embodiment, is an expandable trailer that lengthens from a compact position to one of a plurality of extended positions. The trailer may comprise an axle assembly to mount a plurality of wheels, a frame having a front and a back, and an extension mechanism configured to lengthen the frame from a compact position to one of a plurality of extended positions, such that the front extends a front distance from the axle assembly and the back extends a rear distance from the axle assembly. The extension mechanism further maintains a proportionally greater front distance than the rear distance. As a result, the expandable trailer provides a properly distributed load-bearing area, with respect to the axle assembly, in the compact position as well as the various extended positions.

21 Claims, 11 Drawing Sheets

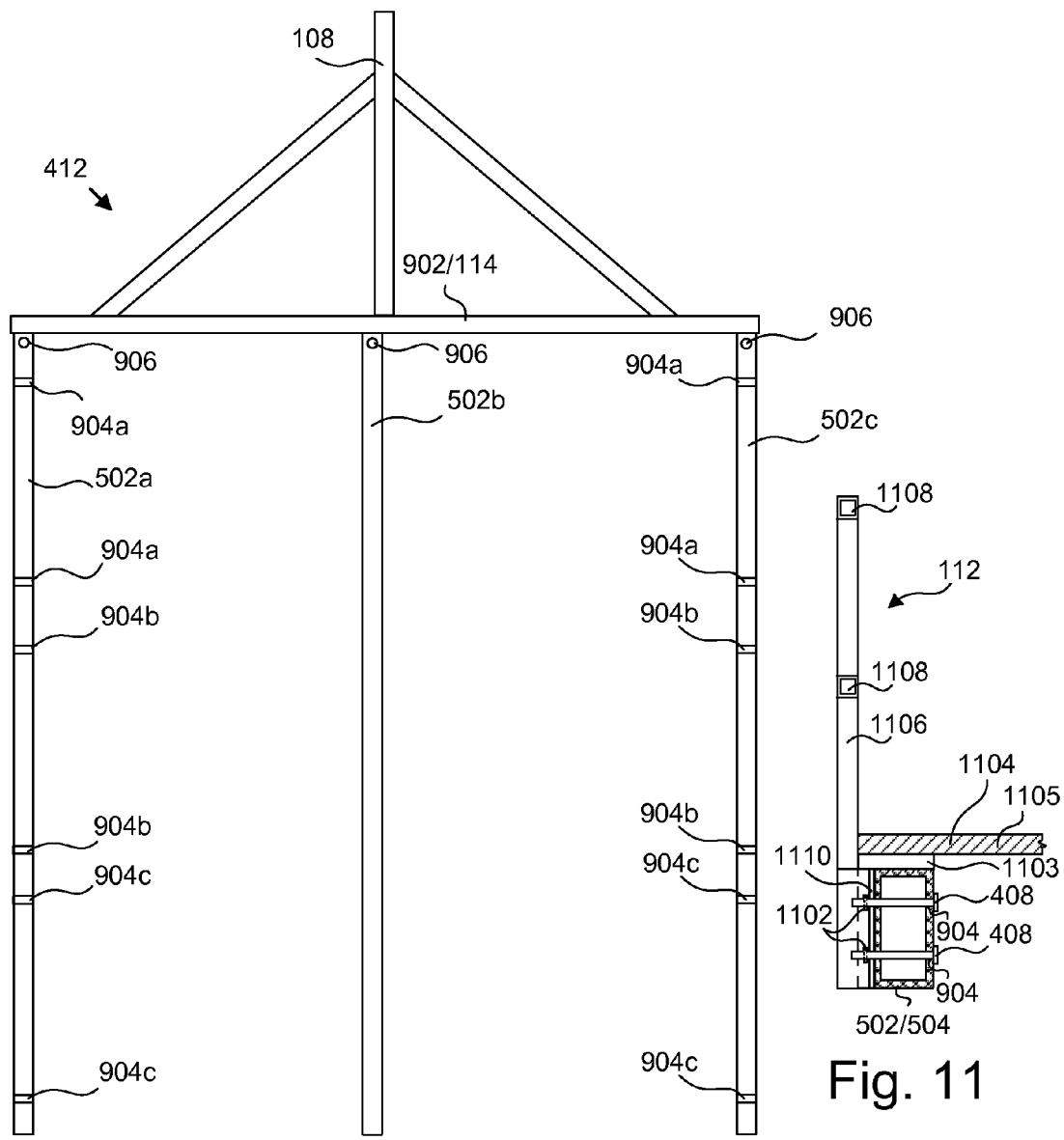
Fig. 9
Fig. 11
Fig. 10

APPARATUS AND SYSTEM FOR AN EXPANDABLE TRAILER

BACKGROUND OF THE INVENTION

1. Field of the Invention

This invention relates to trailers and more particularly relates to expandable trailers.

2. Description of the Related Art

Trailers, which generally include an axle assembly with wheels and a tongue assembly for attaching the trailer to a vehicle, typically enable the vehicle to haul a load from one location to another. Many different types and sizes of trailers are currently available in the market to accommodate various sizes of loads. Heavier or larger loads typically require larger trailers. Similarly, transporting a smaller load can be easily accomplished with a compact trailer. In certain conditions, a user may need both a large trailer and a small trailer because the load size changes based on what is being hauled.

For example, a user having one recreational vehicle (ATV) such as a 4-wheeler may need only a small trailer to carry the ATV. Small ATV trailers typically carry a maximum of two ATVs. However, if more people go on the trip and more than two ATVs are needed, the small ATV trailer is too small to transport all of the ATVs. Consequently, a separate trailer sized for three to four ATVs is needed. Typically, a user is not able to buy and store two trailers of different sizes. Instead, the user may buy a larger trailer to accommodate the maximum number of ATVs. This larger trailer takes up a lot of room, is heavy and unwieldy, and more expensive to pull in situations where only one or two ATVs are being towed.

In certain instances, storage space can be limited, creating a market for expandable and collapsible trailers. An expandable trailer enables the user to adjust the size of the trailer according to a current situation or load requirement.

Both expandable trailers and collapsible trailers currently available, however, have many shortcomings. Collapsible and/or foldable trailers can be difficult to reassemble and can be less reliable than non-collapsible trailers. Collapsible trailers generally lack sufficient structure to support heavy loads. The amount of weight collapsible trailers can support as well as the durability of the axle assembly are often compromised because major support members are omitted, or the support members are jointed or the like.

Expandable trailers generally have a front, rear, or side extension that adds length or width to the trailer frame. The additional length tends to offset the weight balance of the trailer with respect to the axle assembly, making pulling the trailer in an expanded position difficult. In addition, the platform or deck of the trailer may be stacked or stepped to accommodate the trailer expansion. An uneven deck may cause further problems loading the trailer.

From the foregoing discussion, it should be apparent that a need exists for an apparatus and system for an expandable trailer that extends from both the front and the back of the trailer frame relative to the axle assembly. Beneficially, the expandable trailer would maintain a proportionally greater front distance from the axle assembly than the rear distance to preserve a properly distributed load-bearing area. Beneficially, such an apparatus and system would enable the trailer to be proportionally defined in a compact position as well as in a plurality of extended positions. Furthermore, the apparatus and system would provide a continuous platform or deck for supporting a load.

SUMMARY OF THE INVENTION

The present invention has been developed in response to the present state of the art, and in particular, in response to the problems and needs in the art that have not yet been fully solved by currently available trailers. Accordingly, the present invention has been developed to provide an apparatus and system for an expandable trailer that overcomes many or all of the above-discussed shortcomings in the art.

The apparatus, in one embodiment, is an expandable trailer that lengthens from a compact position to one of a plurality of extended positions. The trailer may comprise an axle assembly to mount a plurality of wheels, a frame having a front and a back, and an extension mechanism configured to lengthen the frame from a compact position to one of a plurality of extended positions, such that the front extends a front distance from the axle assembly and the back extends a rear distance from the axle assembly. The extension mechanism further maintains a proportionally greater front distance than the rear distance. As a result, the expandable trailer provides a properly distributed load-bearing area, with respect to the axle assembly, in the compact position as well as the various extended positions.

In one embodiment, the front distance is between about 50 to about 80 percent of a total frame length from the front to the back, and the rear distance is between about 20 to about 50 percent of the total frame length. In one embodiment, the trailer includes one or more securing mechanisms to selectively secure the frame in the compact position or one of the extended positions. In addition, the trailer may comprise one or more supports. The support may be configured to engage the frame and support a load. In certain embodiments, the support includes a connector to engage a corresponding connector of a second support to form a continuous platform, such as a deck.

In certain embodiments, the trailer includes a linkage to proportionally extend and retract the front and the back of the trailer. The linkage may be a hydraulic cylinder, a pneumatic cylinder, a rack and pinion, a screw or threaded rod, a pulley system, or the like. In one embodiment, the frame may comprise the linkage in order to maintain a proportionally greater front distance than rear distance.

In one embodiment, the linkage comprises a plurality of rack and pinion assemblies connected by one or more gears. In such an embodiment, a first extension allowed by a front rack and pinion is proportionally greater than a second extension allowed by a rear rack and pinion. The linkage may include a manual operation mechanism to manually extend and retract the front and the back of the trailer in certain embodiments. Alternatively, a motor may be operatively coupled to the linkage.

The frame of the trailer may comprise a base member, a front member, and a rear member in one embodiment. The extension mechanism may be configured to extend the front member and the rear member from the base member. In one embodiment, the frame comprises an inner channel and an outer channel configured to telescopically engage each other. In addition, the frame may further comprise a bracket and one or more roller supports disposed along the outer channel to facilitate extending the front and the back of the trailer.

A system of the present invention is also presented for an expandable trailer. In particular, the system, in one embodiment, includes an expandable trailer comprising an axle assembly to mount a plurality of wheels, a frame having a front and a back, and an extension mechanism configured to lengthen the frame from a compact position to one of a plurality of extended positions; a linkage configured to proportionally extend and retract the front and the back; and one or more supports configured to engage the frame and support a load.

The supports may be proportionally sized to determine a total frame length from the front to the back such that the front distance is between about 50 to about 80 percent of the total frame length and the rear distance is between about 20 to about 50 percent of the total frame length. In one embodiment, a first support is connected to the frame forming a front platform and a second support is connected to the frame forming a rear platform. Extending the frame creates an opening between the front platform and the rear platform for receiving one or more additional supports.

The system may further include a front platform connected to the frame between the front and the axle assembly and a rear platform connected to the frame between the axle assembly and the back. The front platform and rear platform are fixed in relation to the axle assembly such that activation of the extension mechanism extends the frame to create a first opening between the front and the front platform and a second opening between the back and the rear platform. The first opening and second opening are sized to receive and secure one or more additional supports.

The system may further include one or more attachable side rails configured to engage the frame. The attachable side rails may enhance the trailer in an extended position. The system may further comprise a storage compartment disposed on the frame for storing the one or more supports during transport. The storage compartment may also store the attachable side rails in certain embodiments.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an expandable trailer that extends both a front distance and a rear distance relative to the axle assembly. Beneficially, the expandable trailer maintains a proportionally greater front distance than the rear distance. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is a plan view of one embodiment of a front member of a trailer frame in accordance with the present invention;

FIG. 10 is a side view of the front member of FIG. 9;

FIG. 11 is a cross-sectional view of one embodiment of an attachable side rail secured to an extended tube in accordance with the present invention;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
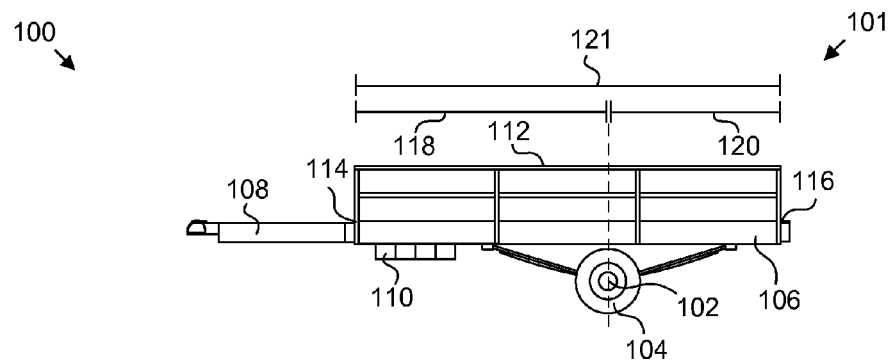
FIG. 1 is a side view illustrating one embodiment of an expandable trailer in a compact position in accordance with the present invention.
Figure 2:
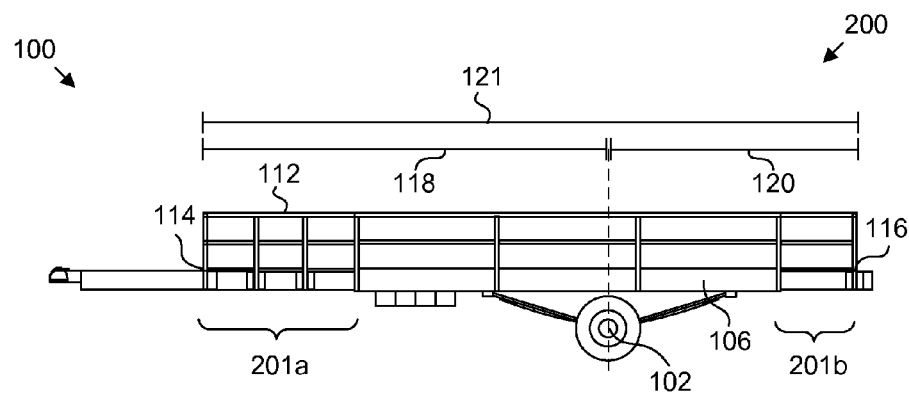
FIG. 2 is a side view illustrating the expandable trailer of FIG. 1 in an extended position in accordance with the present invention.
Figure 3:
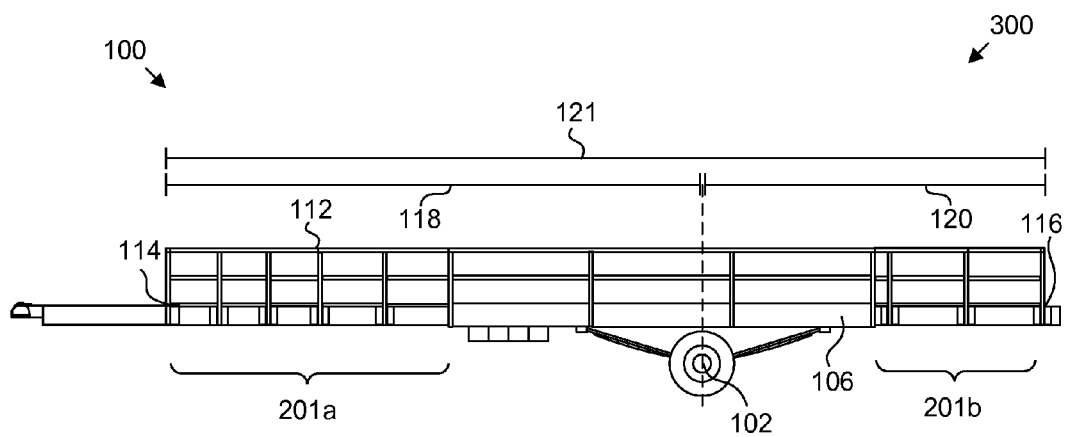
FIG. 3 is a side view illustrating the expandable trailer of FIG. 1 in another extended position in accordance with the present invention.

FIGS. 1-3 illustrate a side view of one embodiment of an expandable trailer 100 of the present invention. FIG. 1 illustrates the trailer 100 in a compact position 101. FIGS. 2-3 illustrate the trailer 100 in expanded positions 200, 300 respectively. The trailer 100, as depicted, includes an axle assembly 102 with wheels 104, a frame 106, a tongue 108, a storage compartment 110, side rails 112, a front 114, and a back 116. The expandable trailer 100 is preferably configured to lengthen from the front 114 and from the back 116 such that a front distance 118 from the front 114 to the axle assembly 102 extends proportional to a rear distance 120 from the axle assembly 102 to the back 116. A total frame length 121 extends from the front 114 to the back 116 of the frame 106. The axle assembly 102 may remain in a fixed position as the front 114 and back 116 of the trailer 100 are extended. In other words, the axle assembly 102 does not move forward with the front 114 or backward with the back 116.

The total area of the frame 106 constitutes the load-bearing area in certain embodiments. In a preferred embodiment, the front distance 118 is proportionally greater than the rear distance 120 to preserve a properly distributed load-bearing area. A properly distributed load-bearing area is one in which more load-bearing area is in front of the axle assembly 102 than behind the axle assembly 102.

The axle assembly 102 includes an axle and a plurality of wheels 104 as is known in the art. In certain embodiments, the axle assembly 102 comprises two or more axles. The axle assembly 102 differentiates the front distance 118 and the rear distance 120 of the trailer 100 in select embodiments. The front distance 118 and the rear distance 120 may or may not be measured from the same axle of the axle assembly 102.

The front distance 118 and the rear distance 120 determine the load distribution of the load-bearing area above the frame, particularly in an embodiment with a single axle 102 as illustrated. In one embodiment, a preferred distribution ratio may be about two-thirds of the weight in front of the axle assembly 102 and about one-third of the weight behind the axle assembly 102. Those of skill in that art will recognize that the size of the load-bearing area in front of the axle assembly 102 and behind the axle assembly 102 is directly related to the amount of weight that can be carried in these areas. This direct relationship is even more evident when similar items such as ATVs are being hauled.

The tongue 108 of the trailer 100 is generally attached to the front 114 of the frame 106 as is known in the art and facilitates attaching the trailer 100 to a vehicle. In addition, the tongue 108 may extend with the frame 106 as illustrated in FIGS. 2-3. In one embodiment, the proportional expansion of the frame 106 for the front distance 118 and the rear distance 120 maintains approximately ten to about twenty-five percent of the total weight of the trailer 100 on the tongue 108 when the load is evenly distributed across the load-bearing area.

The side rails 112 may be connected to the frame 106 as is known in the art. In certain embodiments, the side rails 112 are attachable and/or removable and may be attached to an extension 201 of the frame 106. In one embodiment, the side rails 112 telescopically extend to provide side rails 112 for the extensions 201. In a further embodiment, the side rails 112 facilitate determining a proportional expansion of the frame 106. For example, a side rail 112 may be sized to an extension 201 distance such that extending the frame 106 a length of the side rail 112 preserves the desired ratio of the front distance 118 to the rear distance 120. In yet another embodiment, the side rails 112 are integrated into or coupled to the supports (See FIG. 21). One or more supports may be secured to the frame 106 to support a load.

In certain embodiments, the trailer 100 includes a storage compartment 110 for storing accessories (not shown) during transport, particularly accessories to facilitate expansion of the trailer 100. For example, the storage compartment 110 may contain removable supports to support a load on the trailer 100. In addition, the storage compartment 110 may store attachable side rails 112. In certain embodiments, the accessories enhance the extensions 201 of the frame 106. For example, the supports and the attachable side rails 112 may be attached to the extension 201 of the frame 106 to provide a continuous platform, or deck, and side rails 112 for the trailer 100. The storage compartment 110 may be disposed on the frame 106 and may be located beneath the frame 106 in certain embodiments.

Figure 22:
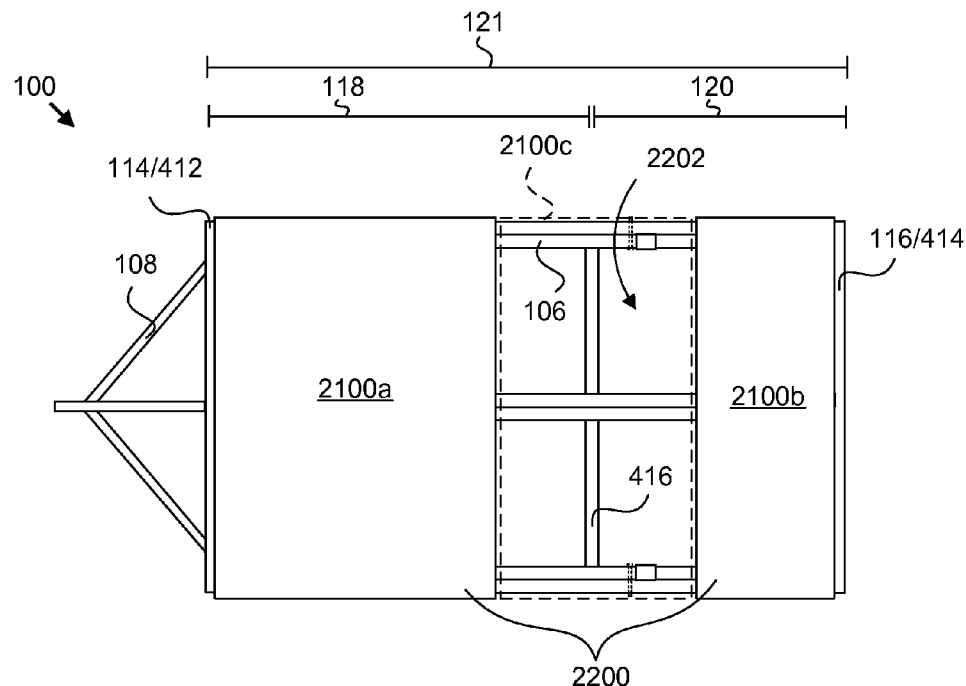
FIG. 22 is a plan view of one embodiment of an expandable trailer extended to receive one or more supports in accordance with the present invention.

FIG. 2 illustrates one embodiment of the trailer 100 in a first extended position 200. The frame 106 enables the front 114 and the back 116 to extend a controlled distance from the axle assembly 102 as illustrated. In the depicted embodiment, the front extension 201a and the back extension 201b of the trailer 100 include removable side rails 112 that attach to the extended portions of the frame 106. In certain embodiments, removable supports engage the frame 106 to form a platform over the extensions 201a-b. In an alternative embodiment, one or more supports are fixed to the frame 106 to form a platform and extend with the frame 106. In one embodiment, when the trailer frame 106 is extended, a front platform extends with the front 114 of the frame 106 and a back platform extends with the back 116 of the frame 106, creating an opening between the front and the back platform, which is illustrated in FIG. 22.

FIG. 3 illustrates the trailer 100 in a second extended position 300. Both the back 116 and the front 114 of the frame 106 are fully extended. In the extended positions 200, 300, the front distance 118 is about 50 to about 80 percent of the total frame length 121, while the corresponding rear distance 120 is about 20 to about 50 percent of the total frame length 121. Proportionally extending the front 114 and the back 116 enables the trailer 100 to maintain a proper load-bearing size distribution such that the load places a proper percentage of the weight toward the front 114 and a proper percentage of weight toward the back 116 of the trailer 100. Consequently, the platform and/or the frame 106 of the trailer 100 remain properly proportioned in a plurality of extended positions 200, 300 and in the compact position 101.

Furthermore, additional supports and attachable or extendable side rails 112 may be added to the front and rear extensions 201a-b. The extended trailer 100 illustrated in FIG. 3 provides substantially the same quality, durability, and support as the compact trailer 100 illustrated in FIG. 1. Maintaining a proportional extension of the frame 106 enables the same trailer 100 to haul a larger load without causing weight imbalances, thereby eliminating the need for multiple trailers 100.

Figure 4:
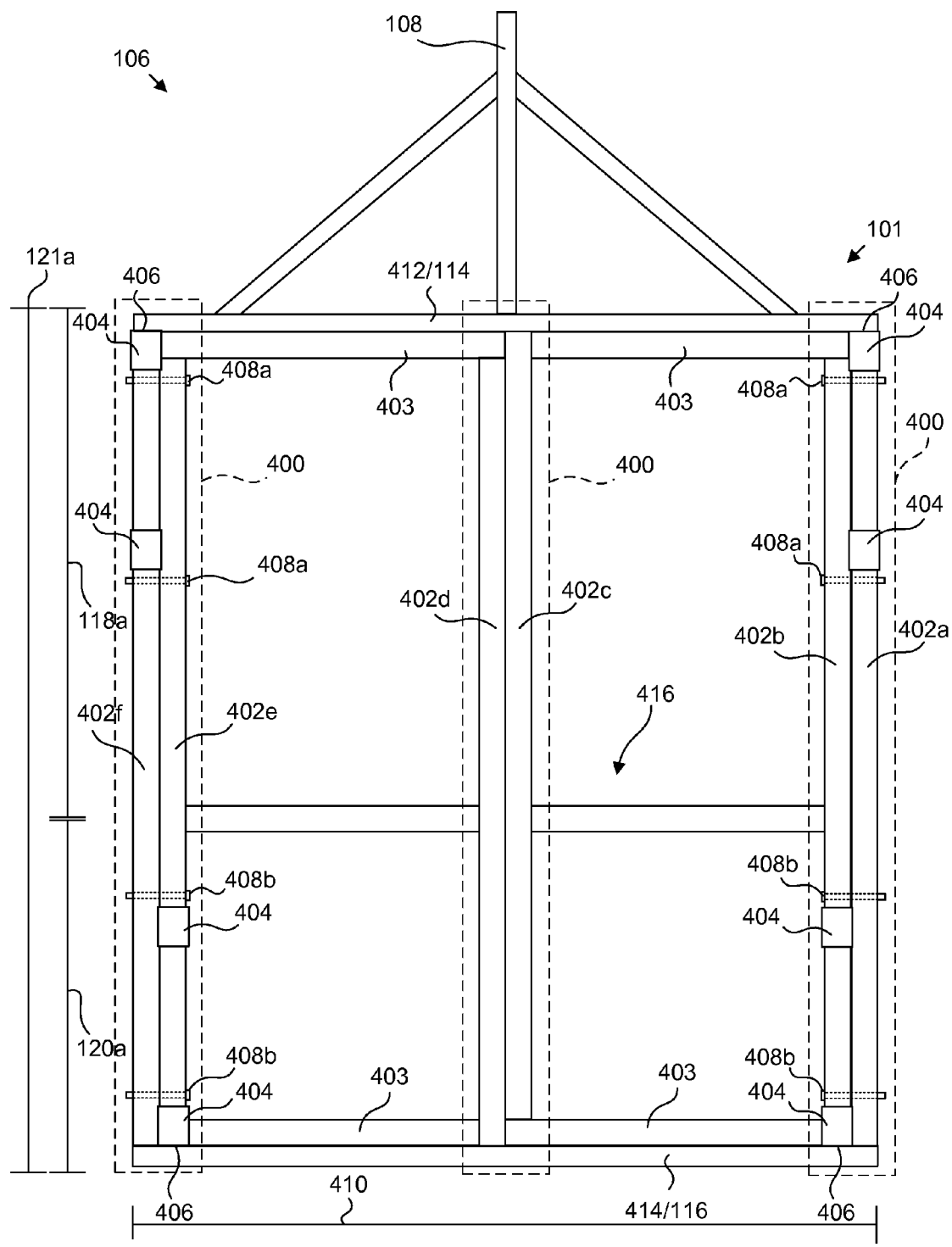
FIG. 4 is a plan view illustrating the expandable trailer of FIG. 1 in a compact position in accordance with the present invention.

FIG. 4 illustrates a plan view of one embodiment of the frame 106 of the trailer 100 in a compact position 101 in accordance with the present invention. The depicted frame 106 may be similar to the frame 106 illustrated in FIGS. 1-3 and may include a front member 412, a rear member 414, and a base member 416. An extension mechanism 400 is configured to lengthen the frame from a compact position 101 to an extended position 200, 300. Those of skill in the art will recognize that the extension mechanism 400 may be a linkage, a mechanically driven device, a frame member, and/or the like and is not limited to the illustrated embodiment.

The frame 106 commonly supports a platform (not shown) or deck of the trailer 100 as is known in the art. The frame 106 of the present invention, however, extends from the front 114 and from the back 116 as discussed above to lengthen the total frame length 121 to multiple extended positions 200, 300. To support extension of the frame 106, the trailer 100 includes one or more extension mechanisms 400 to lengthen the frame 106 from a compact position 101. The extension mechanism 400 further maintains a proportionally greater front distance 118a than the rear distance 120a.

In the depicted embodiment, the extension mechanism 400 comprises a plurality of outer tubes 402 for receiving a corresponding inner tube (See FIG. 7A) of the front and rear members 412, 414. The front member 412 and the rear member 414 may be configured to extend telescopically from the outer tubes 402. In one embodiment, the outer tubes 402 are comprised of metal and are welded together in pairs as illustrated. The outer tubes 402 may further be fixed to the base member 416 and may comprise the base member 416 in certain embodiments. In addition, one or more connecting members 403 may connect the outer tubes 402.

Those of skill in the art will recognize that the present invention is not limited to embodiments that use outer tubes 402 and inner tubes 708. Specifically, those of skill in the art will recognize that certain members of the present invention are interchangeable with other structural members in the art which will serve substantially the same purpose as the outer tubes 402 and inner tubes 708 described. For example, embodiments of the present invention may include channels, I-Beams, C-Channels, U-Channels, angled iron or aluminum or the like used in place of outer tubes 402 and inner tubes 708.

The base member 416 may be fixed to the axle assembly 102 (See FIG. 1) to provide stability to the trailer 100. In certain embodiments, the front member 412 and the rear member 414 extend from the base member 416. The base member 416 may further support additional frame members (not shown), a motor (not shown), linkages, or other mechanisms that provide structure or functionality to the trailer 100. Those of skill in the art will recognize that the base 416 may support many different types of structures and extension mechanisms 400 and is not limited to the illustrated embodiments.

To facilitate extension, the extension mechanism 400 may include one or more brackets 404 and roller supports, which will be described in greater detail with relation to FIGS. 7A-8. The brackets 404 may be disposed along the outer tubes 402 and may be positioned near an extension opening 406 to support the front and rear members 412, 414 during extension.

To secure the front and rear members 412, 414, the frame 106 and/or extension mechanism 400 may include one or more securing mechanisms 408. The securing mechanism 408 enables the frame 106 to be selectively secured in the compact position 101 or in multiple extended positions 200, 300. In the depicted embodiment, pins 408 prevent the front and rear members 412, 414 from sliding out of the outer tubes 402.

The extension mechanism 400, in one embodiment, is configured such that inserting a pin 408 through designated holes maintains a proper proportional expansion distance of the front and rear members 412, 414. In the depicted embodiment, a plurality of holes are strategically positioned in the front and rear members 412, 414 as well as in the outer tubes 402 for receiving the pins 408. The hole positions prevent the front and rear members 412, 414 of the frame 106 from being expanded and secured in disproportionate extended positions.

Other securing mechanisms 408 may be suitable for securing the expandable frame 106 of the trailer 100. Preferably, the securing mechanisms 408 are configured to selectively secure and release the expandable frame 106 as desired by a user. Clamps, locks, pins with cotter pins, fasteners, and the like may serve as securing mechanisms 408 to secure the frame 106.

Given by way of example, the total frame length 121a maybe about eight feet long in certain embodiments in the compact position 101. Accordingly, the front distance 118a may be about four feet to about six feet long, or about fifty percent to about eighty percent of the total frame length 121. The rear distance 120a may be about two feet to about four feet, or about twenty percent to about fifty percent of the total frame length 121. The extension distances 118b-c, 120b-c are illustrated by way of example only in FIGS. 5-6 as well. The width 410 of the trailer 100 may be about seven feet.

In select embodiments, the frame 106 may be configured to double in size such that the length 121c of the frame 106 in a fully extended position 300 is twice the length 121a of the frame 106 in the compact position 101. For example, a frame 106 measuring about twelve feet long in the compact position 101 may expand to a length of about twenty-four feet in the extended position 300. Those of skill in the art will recognize that the trailer 100 may expand to a plurality of lengths 121 and expanded positions 200, 300 and is not, therefore, limited to the illustrated embodiments.

Figure 5:
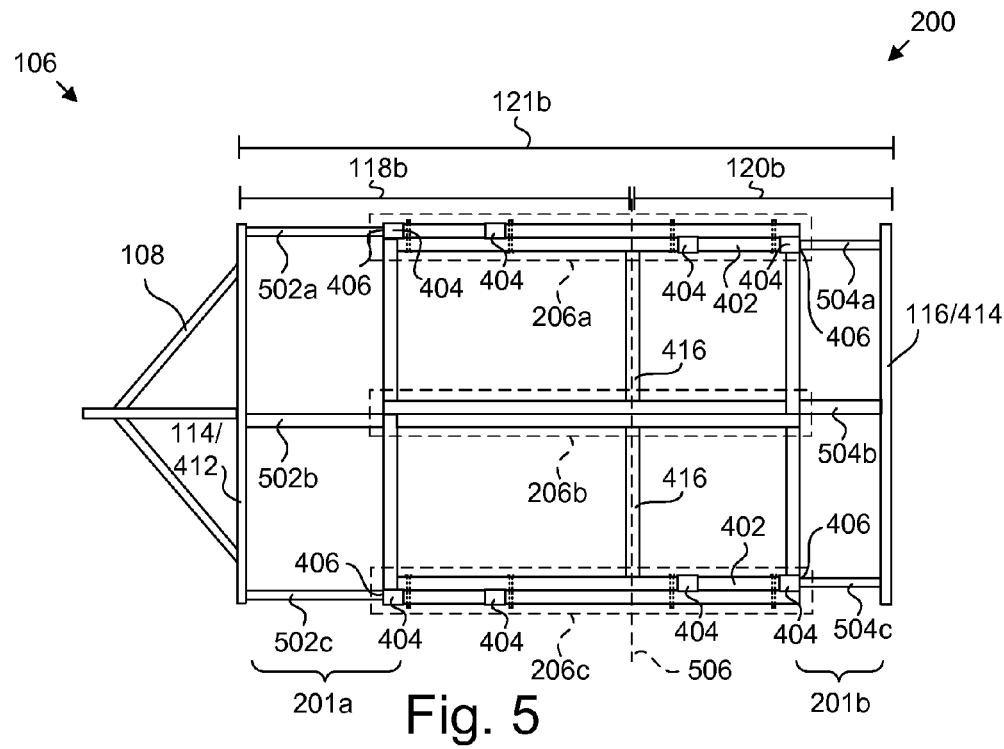
FIG. 5 is a plan view illustrating the expandable trailer of FIG. 1 in an extended position in accordance with the present invention.
Figure 6:
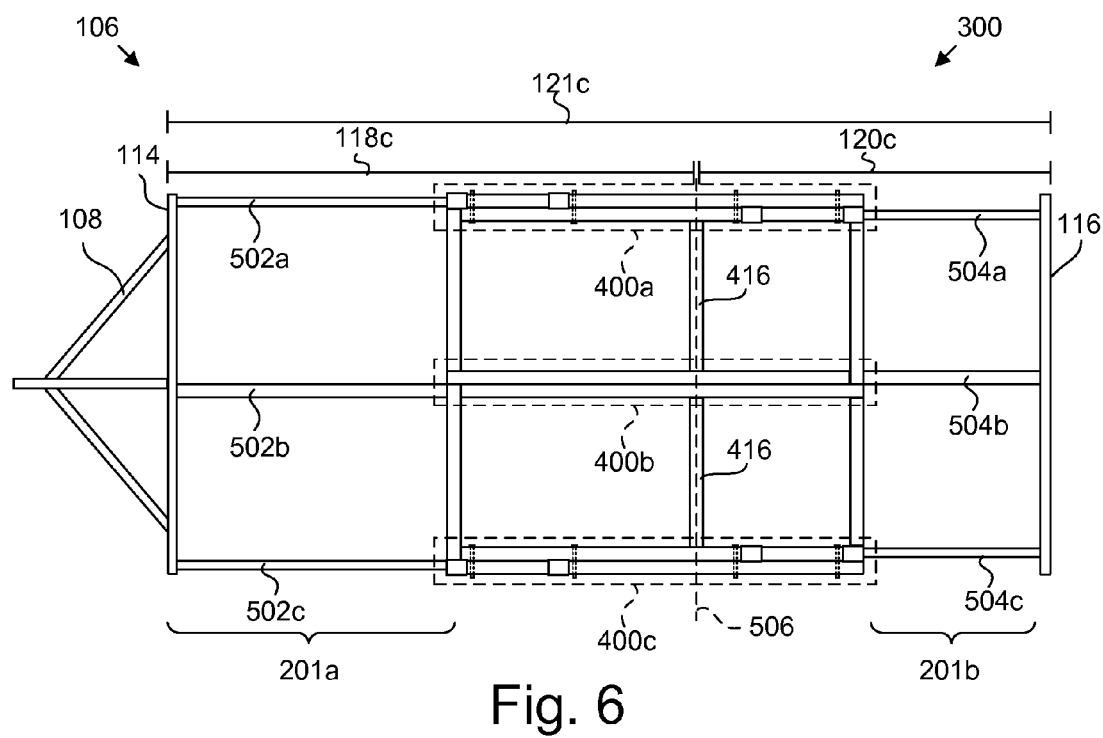
FIG. 6 is a plan view illustrating the expandable trailer of FIG. 1 in another extended position in accordance with the present invention.

FIGS. 5-6 illustrate one embodiment of the frame 106 of the trailer 100 in the extended position 200 and extended position 300 respectively. The extension mechanism 400 may facilitate extending the front member 412 and the rear member 414 from the base member 416. The front member 412 may comprise one or more inner tubes 502a-c or channels in certain embodiments. Similarly, the rear member 414 may comprise one or more inner tubes 504a-c. The inner tubes 502, 504 may telescopically extend from the openings 406 of the outer tubes 402 in certain embodiments. In the depicted embodiment, the extension mechanism 400 and/or the base member 416 remains fixed relative to the axle assembly (indicated by dashed line 506). As a result, the front 114 is able to extend a front distance 118b that is proportionally greater than the rear distance 120b.

In one embodiment, the frame 106 extends in a manner similar to a leaved table configured to receive additional leaves in the central area of the table. The base member 416 and/or extension mechanism 400 may support the front member 412 and the rear member 414, which subsequently slide parallel to each other to extend the deck and/or support platform. The support structure, such as the axle assembly 102 and/or the base member 416, remains in its original position.

One or more supports (illustrated in FIGS. 21-23) may engage the frame 106 to form a platform or deck for supporting a load. The platform may be continuous to form a solid deck or the platform may have gaps, openings, or the like. In one embodiment, the supports are added to the extensions 201 to extend an existing deck after the front member 412 and rear member 414 are extended. The supports may then be subsequently removed and the front member 412 and rear member 414 moved toward the frame 106 to transition the trailer 100 to the compact position 101. Alternatively, the supports may be added near the axle assembly 102, near line 506, as described below.

Referring still to FIGS. 5-6, in one embodiment, the trailer 100 includes a front platform (illustrated in FIGS. 22-23 and not in FIGS. 5-6 for clarity) connected to the frame 106 between the front 114 and the axle assembly (indicated by dashed line 506) and a rear platform (illustrated in FIGS. 22-23) connected to the frame 106 between the axle assembly 506 and the back 116. The front platform and rear platform are fixed in relation to the axle assembly 506 such that activation of the extension mechanism 400 extends the frame 106 to create a first opening 201a between the front 114 and the front platform and a second opening 201b between the back 116 and the rear platform. The first opening 201a and second opening 201b are sized to receive and secure one or more additional supports.

The front member 412, rear member 414, and base member 416 are made from aluminum in one embodiment for strength and light weight. Alternatively, the frame 106 and its members may be made from metal, wood, steel, plastic, or any material that is suitable for supporting a load.

Given by way of example, the total length 121b of the frame 106 in an intermediate extension position 200 may be about twelve feet. The front distance 118b may be about six to about nine feet, or about fifty to about eighty percent of the total frame length 121b, and the rear distance 120b may be about three to about six feet, or about twenty to about fifty percent of the total frame length 121b.

FIG. 6 illustrates one embodiment of the frame 106 of the trailer 100 in a fully extended position 300. The extension mechanism 400 maintains a proportionally greater front distance 118c than the rear distance 120c. Given by way of example, the total frame length 121c may be extended to about sixteen feet. The front distance 118c may be about eight to about twelve feet, or about fifty to about eighty percent of the total frame length 121c, and the rear distance 120c may be about four to about eight feet, or about twenty to about fifty percent of the total frame length 121c. The extension mechanism 400 provides support for the extension position 300 in certain embodiments.

Figures 7A, 7B:
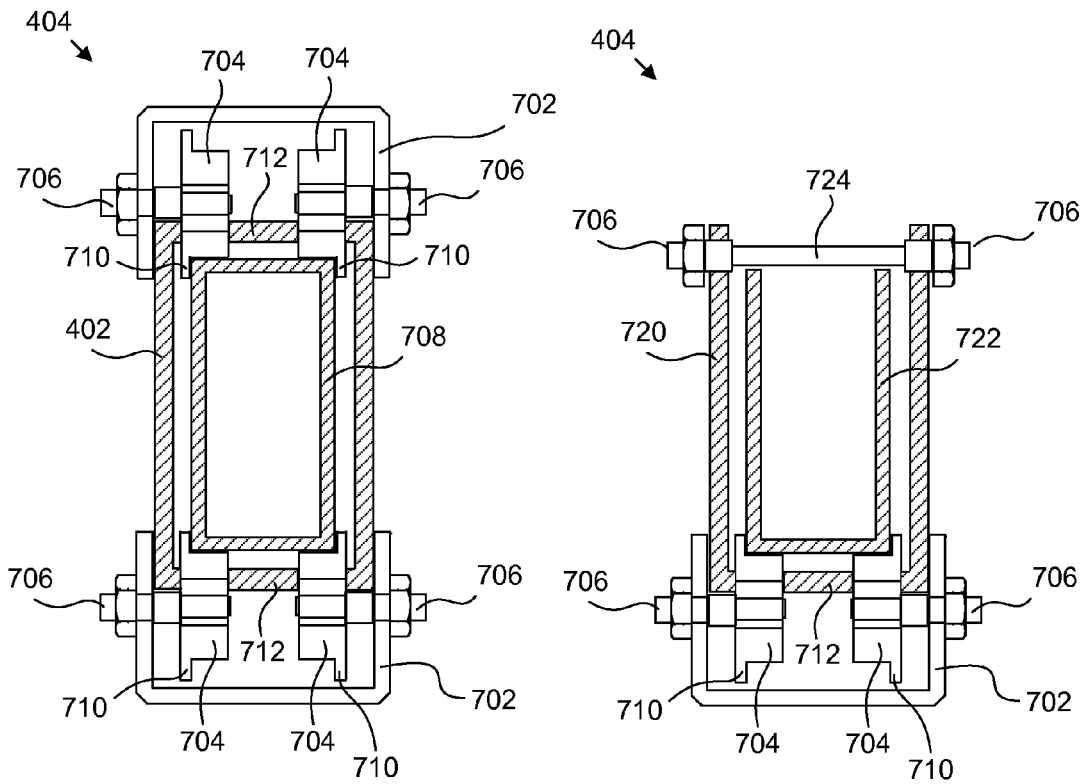
FIG. 7A is a cross-sectional view of one embodiment of a roller support bracket in accordance with the present invention.
FIG. 7B is a cross-sectional view of one embodiment of a roller support bracket engaging an inner channel and an outer channel in accordance with the present invention.

FIG. 7A illustrates a cross-sectional view of one embodiment of a bracket 404. The bracket 404, in the depicted embodiment, includes U-shaped end brackets 702, roller supports 704, and fasteners 706. The end brackets 702 are secured to opposite sides of the outer tube 402 of the extension mechanism 400 in one embodiment. Each end bracket 702 mounts one or more cam followers 704 that contact an inner tube 708, such as the inner tubes 502a-c, 504a-c of the front and rear members 412, 414 illustrated in FIGS. 5-6.

The cam followers 704 provide a roller support to facilitate transitioning the inner tube 708 within the outer tube 402. The transition may expand the trailer 100 from the compact position 101 to one of the extended positions 200,300. Those of skill in the art will recognize a variety of substitutes for the cam followers 704 including rollers, bearings, wheels, lubricant, and the like.

In the depicted embodiment, the cam followers 704 support the inner tube 708. A flange 710 aligns the inner tube 708 with the cam followers 704. The outer tube 402 may include one or more openings 712 for the cam followers 704 to protrude through the opening 712 to contact the inner tube 708. In the depicted embodiment, the U-shaped end brackets 702 may provide sufficient support for steel inner 708 and outer 402 tubes.

In an alternative embodiment, the bracket 404 may comprise a single continuous band (not shown) of material that surrounds the outer surface of the outer tube 402. The band may support the roller supports 704 and fasteners 706. The band may provide reinforcement for the opening 406 and for the outer tube 402. Reinforcements may be particularly beneficial in an embodiment where the tubes 402,708 are made of aluminum. Aluminum provides a light weight frame 106 that can be easily transitioned from a compact position 101 to an extended position 200, 300. Aluminum may also be desirable in an embodiment that requires manual strength to transition the frame 106.

FIG. 7B illustrates a cross-sectional view of an alternative embodiment of a bracket 404 with a roller support 704. The bracket 404 facilitates transitioning of an outer channel 720 and an inner channel 722 that telescopically engage each other. The inner channel 722 may be retained in place by a cross member 724 or the like. The cross member 724 may connect to each side of the outer channel 720 or may comprise a pin, bolt or other fastener that connects each side of the outer channel 720.

The cam followers 704 may be disposed along the outer channel 720 to facilitate extending the inner channel 722. In certain embodiments, extending the inner channel 722 extends the front 114 or the back 116 of the trailer 100. In a further embodiment, the extension mechanism 400 controls the extension distance of the inner channel 722. For example, a securing mechanism 408 (See FIG. 4), such as spring loaded pins (not shown) or the like may engage the inner channel 722 to selectively enable the inner channel 722 to extend a specified distance from the outer channel 720. Those of skill in the art will recognize that multiple forms of brackets 404, roller supports 704, channels 720, 722 or other forms of extensions mechanisms 400 may be used to expand the frame 106 of the trailer 100.

Figure 8:
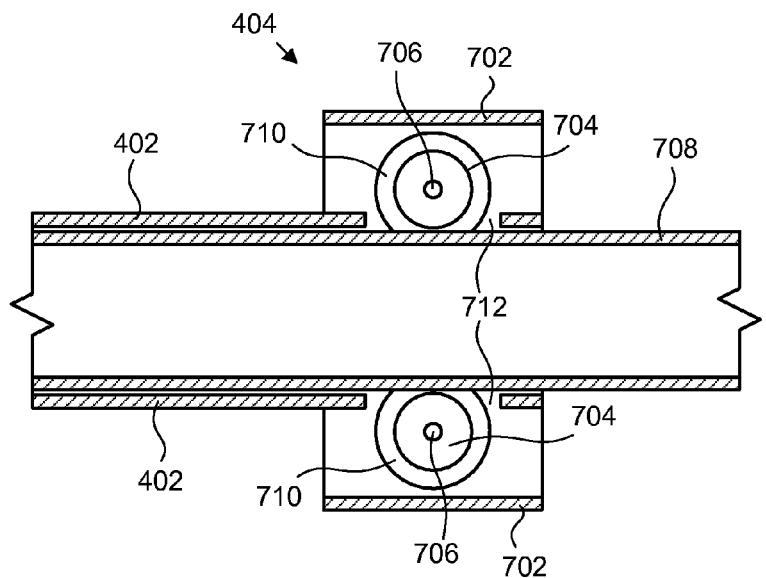
FIG. 8 is a cross-sectional side view of the roller support bracket of FIG. 7A.

FIG. 8 illustrates a cross-sectional side view of the bracket 404 of FIG. 7A. The inner tube 708 is supported by the flanged cam follower 704 and transitions within the outer tube 402. Roller supports 704 may be particularly advantageous to facilitate extending telescoping front and rear members 412, 414. In one embodiment, the user manually extends the front and rear members 412, 414. The user may disengage the securing mechanism 408 and pull the front and/or rear member 412, 414 until a desired extension position 200, 300 is reached. The roller supports 704 enable the user to easily extend the front 114 and the back 116 of the trailer 100. In certain embodiments, the front and rear member 412, 414 are linked to extend simultaneously. In an alternative embodiment, the user must individually extend the front and rear members 412, 414.

FIGS. 9-10 illustrate a plan view and a side view, respectively, of one embodiment of a front member 412. The front member 412 may be connected to the tongue 108 of the trailer 100 and enables extension of the front 114 of the trailer 100. In one embodiment, the front member 412 comprises a plurality of tubes 502a-c or channels that correspond to outer tubes 402 of the extension mechanism 400.

The tubes 502a-c may extend from a connecting tube 902 that connects to one end of the tubes 502a-c. The tubes 502a-c may be welded or otherwise fastened to the tube 902. In one embodiment, the connecting tube 902 comprises the front 114 of the trailer 100. A central tube 502b may be slightly off-centered from the tongue 108 to align with an outer tube 402d of the extension mechanism 400 (See FIG. 4). Side tubes 502a, 502c may include holes 904 for receiving a securing mechanism 408 or pin 408 as discussed above. The holes 904 may be spaced to enable the front member 412 to expand proportionally to a rear member 414. In the depicted embodiment, the holes 904 may be grouped according to an extension position 101, 200, 300.

For example, in the compact position 101, the holes 904a and holes 904c may be aligned with holes in the outer tubes 402 and holes in the tubes 504a-c (See FIGS. 5-6) of the rear member 414. The pins 408 secured through the holes 904 may secure both tubes 502a-c and tubes 504a-c. In the extended position 200, the tubes 502a-c may be partially extended and the holes 904b may be aligned and secured to the outer tube 402. In the extended position 300, the front member 412 may be fully extended and the holes 904c may be aligned with holes in the outer tube 402 (which may be located near the front of the extension mechanism 400 about where pins 408a are illustrated in FIG. 4 in certain embodiments).

In certain embodiments, the holes 904 have dual functionality to facilitate securing the frame 106 in multiple extended positions 200, 300, and to fasten side rails 112 to the extensions 201.

In select embodiments, a support or platform may be attached to the tubes 502a-c of the front member 412. As a result, the platform may transition with the front member 412 when the trailer 100 is expanded. In one embodiment, the front member 412 includes additional holes 906 to enable the support to be fastened to the front member 412 with a bolt and nut or other such fastener. In certain embodiments, the outer tube 402 may be configured or shaped to accommodate the fastener or the like.

FIG. 11 illustrates one embodiment of a side rail 112 secured to a tube 502, 504 with pins 408. The holes 904 may be strategically spaced to demarcate a suitable extension distance that maintains a proportional expansion. In addition, the holes 904 in the tube 502, 504 may be used to facilitate attaching a side rail 112 in the extended positions 200, 300, as a portion of the tubes 502, 504 are exposed when extended.

The side rail 112 may include a vertical member 1106 and a plurality of horizontal members 1108, which may also be made of aluminum in certain embodiments. The side rails 112 may be mounted to the extended tube 502, 504 with a mounting flange 1110. Consequently, the side rails 112 and the support 1104 may be easily removed by extracting the pins 408. In certain embodiments, a support member 1103 and/or a platform 1104 is connected to the side rail 112.

The pins 408 are secured with clips 1102, nuts, or the like. FIG. 11 further illustrates one embodiment of a support 1104 disposed on top of the tube 502, 504. The support 1104 may comprise a support member 1103 secured to a platform 1105. The support member 1103 may position the platform 1105 such that the platform 1105 is level with a platform fixed to the extension mechanism 400 in certain embodiments. In one embodiment, the support member 1103 is about as thick as the outer tube 402 and is made of aluminum. The platform 1105 may comprise marine grade plywood. Of course, the support 1104 may be comprised of a variety of materials.

Figure 12:
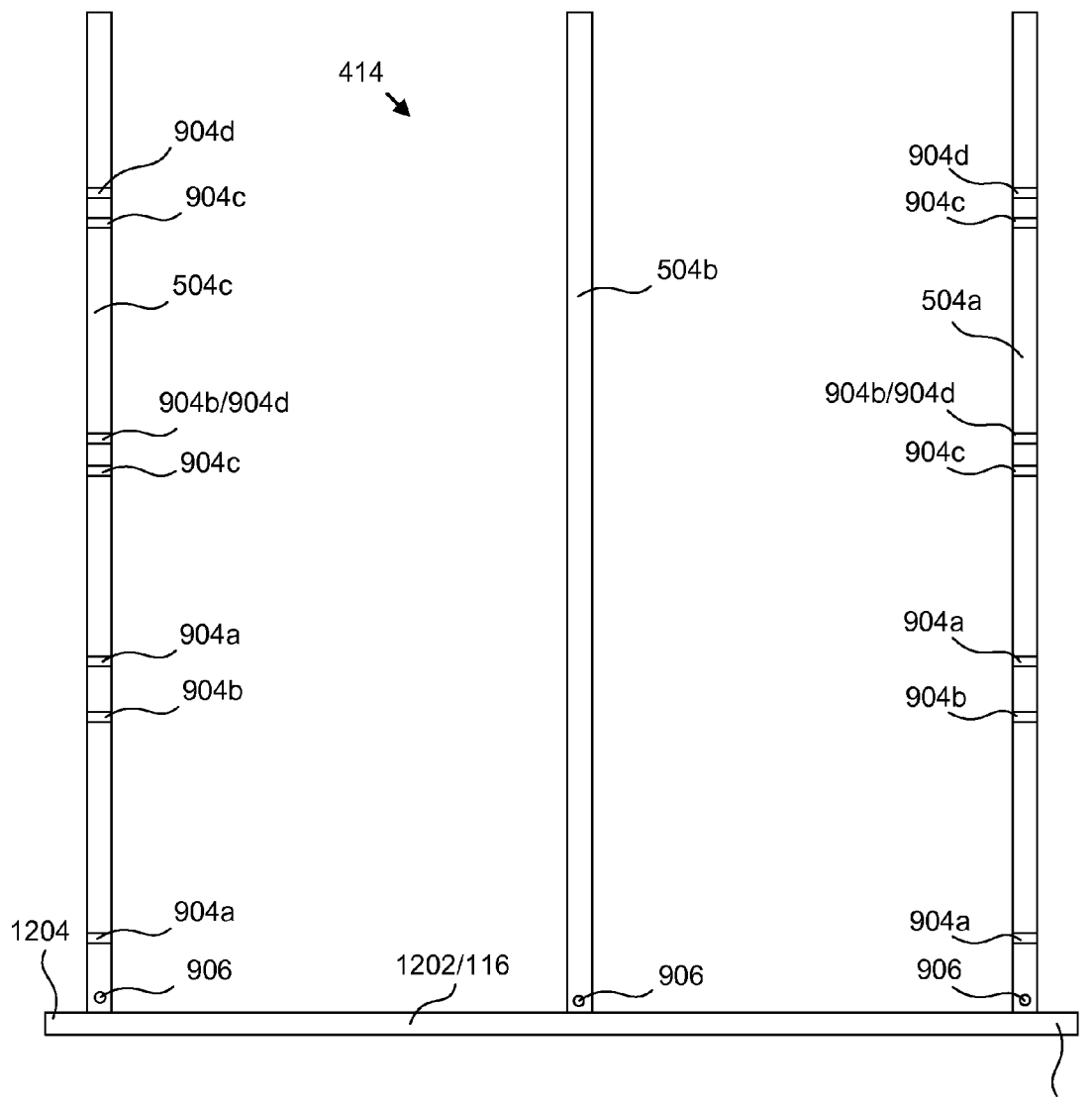
FIG. 12 is a plan view of one embodiment of a rear member of a trailer frame in accordance with the present invention.
Figure 13:
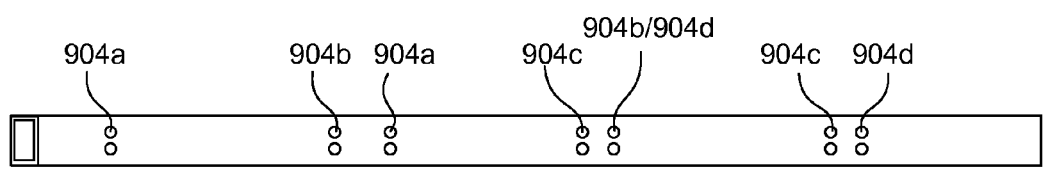
FIG. 13 is a side view of the rear member of FIG. 12.

FIGS. 12-13 illustrate a plan view and a side view, respectively, of one embodiment of a rear member 414. The rear member 414 enables extension of the back 116 of the frame 106 in certain embodiments and may be similar to the front member 412.

The rear member 414 in the depicted embodiment comprises a plurality of tubes 504a-c or channels that correspond to outer tubes 402 of the extension mechanism 400. In addition, the tubes 504 may extend from a connecting tube 1202 that connects the extended tubes 504 at one end. The ends 1204 of the connecting tube 1202 may extend beyond the tubes 504a, 504c to cover the ends of the outer tubes 402 of the extension mechanism 400 in a compact position 101. The connecting tube 1202 comprises the back 116 of the frame 106 in certain embodiments.

The holes 904 similarly may enable the rear member 414 to be secured with pins 408 as illustrated in FIG. 4. Furthermore, the holes 904 may be strategically spaced to enable the trailer 100 to expand proportionally as discussed above. The holes 904 in the tubes 504 of the rear member 414 may be spaced closer together than the holes 904 in the front member 414. The strategic spacing of the holes 904 enables the rear member 414 to extend a set distance that proportionally corresponds to the extension of the front member 414. In addition, the holes 904 may facilitate attaching side rails 112 to the extensions 201.

The holes 904 may be grouped to enable the holes 904 to correspond to holes (referring to pins 408 in FIG. 4) in the extension mechanism 400 and in the front member 412. In one embodiment, the holes 904a, 904d are aligned with the holes in the outer tubes 402 in the compact position 101. In the extended position 200, the holes 904b are aligned with the holes 408b of the outer tubes 402, and in the extended position 300, the holes 904c are aligned with holes 408b. Consequently, the holes 904 align with holes in the outer tubes 402, yet enable the rear member 414 to extend a distance proportional to the extension distance of the front member 412.

Figure 14:
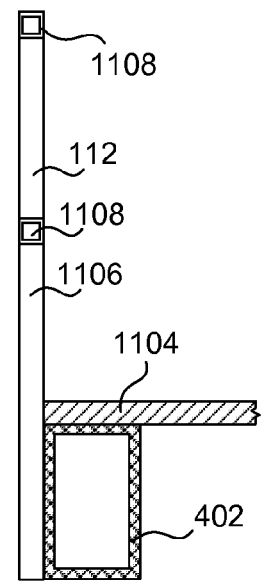
FIG. 14 is a cross-sectional view illustrating one embodiment of a side rail attached to an outer tube in accordance with the present invention.

FIG. 14 illustrates a cross-sectional view of one embodiment of the outer tube 402 fixed to a side rail 112 and a support 1104. In certain embodiments, the side rail 112 may be attached directly to the outer tube 402. In addition, the support 1104 similarly may contact the outer tube 402 directly. The support 1104 may align with additional supports 1104 that are added to the extensions 101 of the trailer 100.

Figure 15:
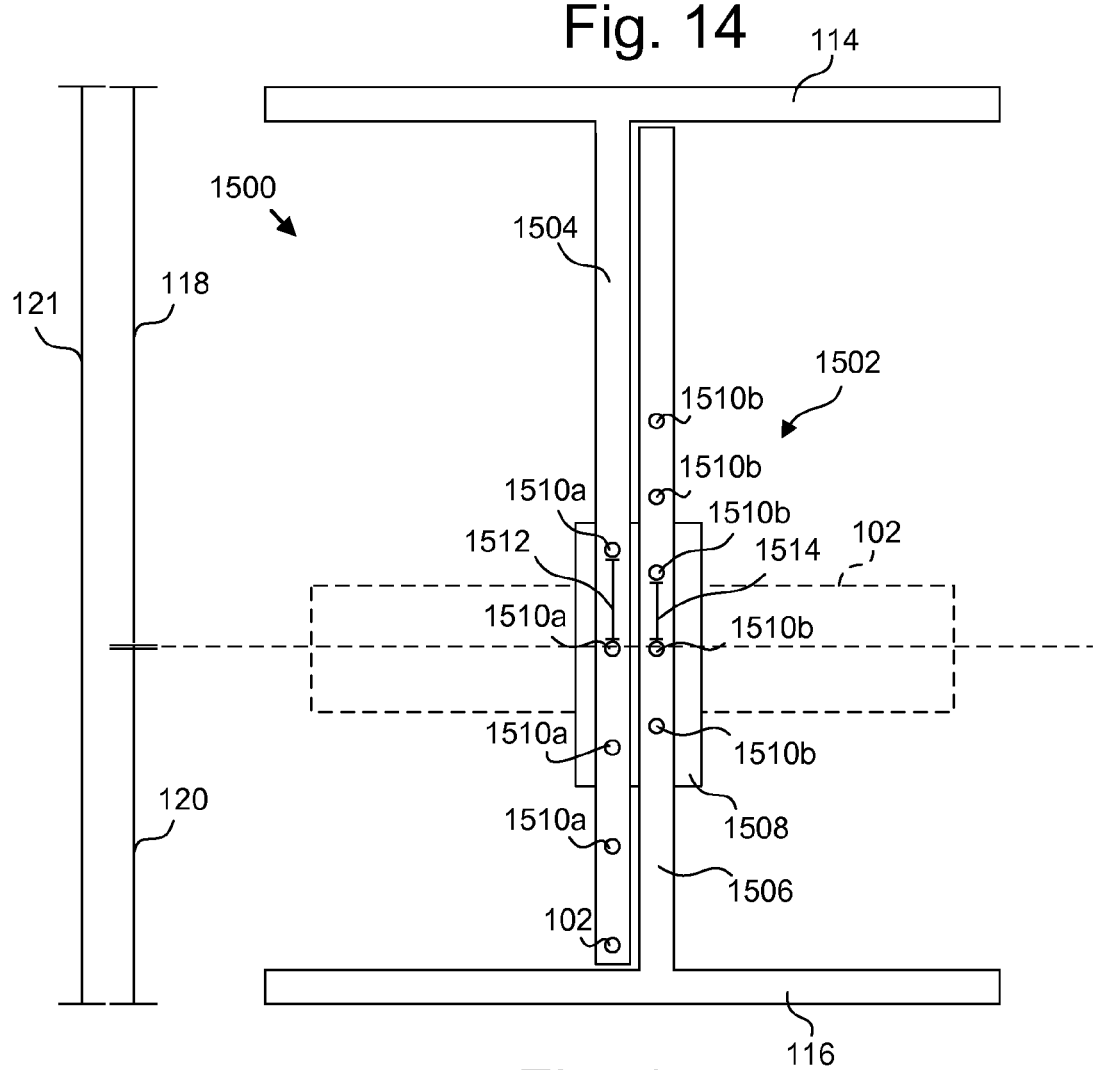
FIG. 15 is a plan view illustrating one embodiment of a frame with an extension mechanism in accordance with the present invention.

FIG. 15 illustrates an alternative embodiment of a trailer frame 1500 having an extension mechanism 1502 in accordance with the present invention. The frame 1500 as depicted includes a front member 1504, a rear member 1506, and a base member 1508, which may each comprise flat metal plates in certain embodiments. The base member 1508 may be fixed to the axle assembly 102.

The extension mechanism 1502 may comprise holes 1510, similar to holes 904, for securing the front and rear members 1504, 1506 to the base member 1508. The holes 1510 may be strategically spaced to allow the user to adjust the extension of the front and rear members 1504, 1506. The holes 1510a in the front member 1504 may be spaced apart a distance 1512 that is greater than the distance 1514 between the holes 1510b of the rear member 1506. As a result, the front and rear members 1504, 1506 may be proportionally extended such that the front distance 118 is proportionally greater than the rear distance 120.

The extension mechanism 1502 in certain embodiments further comprises one or more linkages configured to proportionally extend and retract the front 114 and the back 116 of the frame 1500. The linkage may comprise a manual operation mechanism in certain embodiments. Alternatively or in addition, the linkage may be operatively coupled to a motor. In select embodiments, the linkage 1402 extends and retracts both the front member 1504 and the rear member 1506 simultaneously. Alternatively, the linkage may extend only one of the front member 1504 and the rear member 1506. Given by way of example, the linkage may comprise a hydraulic cylinder, a pneumatic cylinder, a rack and pinion, a screw or threaded rod, a pulley system, an electric cable drive expansion system, a hand crank expansion mechanism, and the like.

Figure 16:
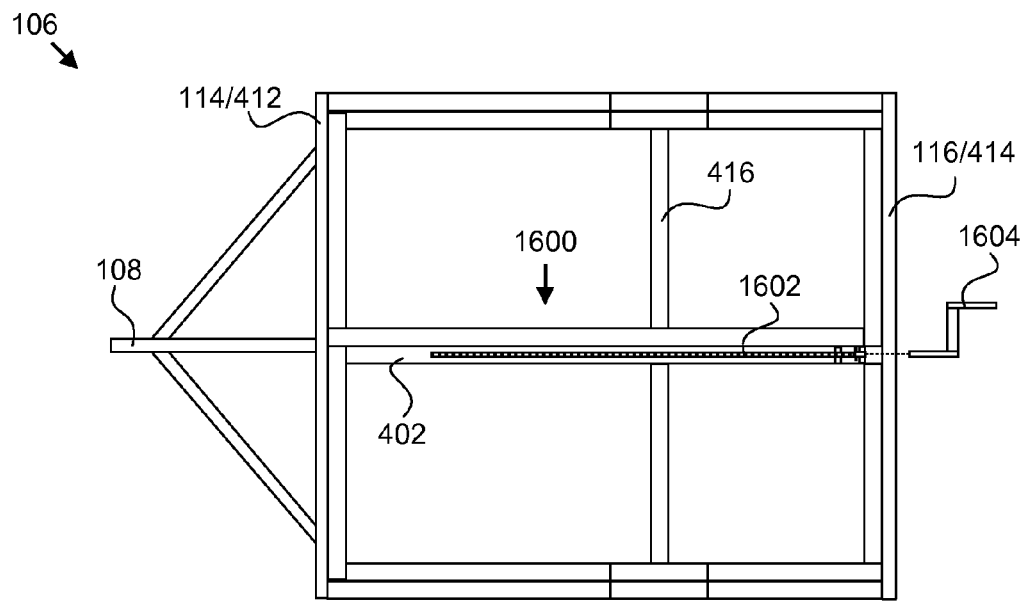
FIG. 16 is a plan view of one embodiment of a frame with a threaded rod in accordance with the present invention.

FIG. 16 illustrates one embodiment of a frame 106 with a linkage 1600. The linkage 1600 comprises a threaded rod 1602 configured to extend and retract the front member 412. The threaded rod 1602 may be driven by a motor or by a manual operation mechanism such as a hand crank 1604. In the depicted embodiment, the threaded rod 1602 is secured to the base member 416 and extends through the interior of the inner tube 502b of the front member 412.

Figure 17:
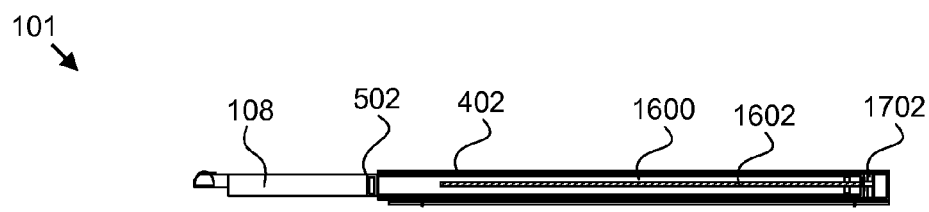
FIG. 17 is a cross-sectional side view of the frame of FIG. 16 in a compact position in accordance with the present invention.
Figure 18:
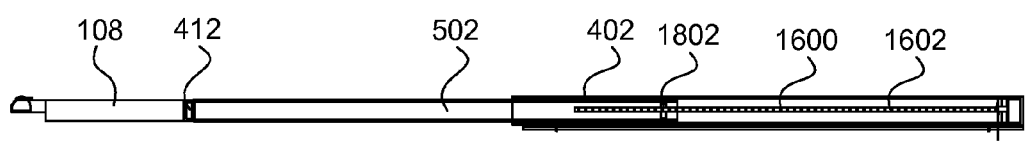
FIG. 18 is a cross-sectional side view of the front member of the frame of FIG. 16 in an extended position in accordance with the present invention.

FIGS. 17-18 illustrate a cross-sectional side view of the frame 106 and the linkage 1600 of FIG. 16. FIG. 17 illustrates the frame 106 in a compact position 101. In the depicted embodiment, the threaded rod 1602 is internally secured near the back end of the outer tube 402 with a mounting bracket 1702. The threaded rod 1602 passes through the interior of the outer tube 402 and the inner tube 502.

FIG. 18 illustrates the frame 106 in an extended position 300. The threaded rod 1602 drives a corresponding threaded member 1802, which may be secured within the inner tube 502 to telescopically extend the front member 412. Similarly, a threaded rod 1602 may be used to retract the rear member 414.

Figure 19:
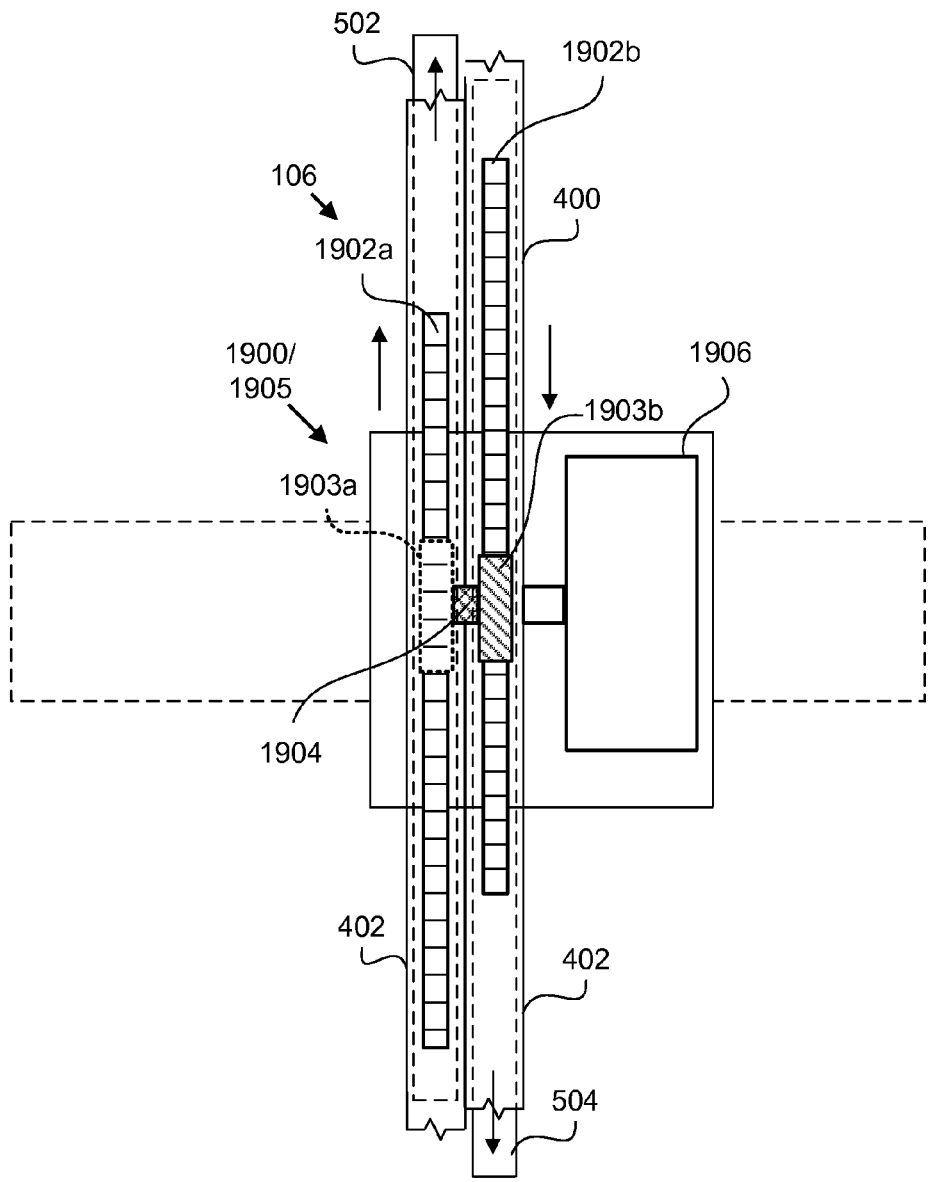
FIG. 19 is a plan view of one embodiment of a pair of rack and pinion assemblies configured to proportionally extend the front and the back of a trailer in accordance with the present invention.

FIG. 19 illustrates another embodiment of an extension mechanism 400 with a linkage 1900. The linkage 1900 as illustrated comprises a pair of racks 1902 and corresponding pinions 1903 connected by a gear 1904, forming a pair of rack and pinion assemblies of 1905. The gear 1904 may be driven by a motor 1906 in certain embodiments. Alternatively, the gear 1904 may be turned by manual force applied to the rack and pinion assemblies 1905.

In one embodiment, the rack 1902a is disposed within a tube 502 of the front member 412 on the top interior surface, and the rack 1902b is disposed within a tube 504 of the rear member 414 on the bottom interior surface. The size of the pinions 1903 may be configured to regulate the distance the tubes 502, 504 extend from the outer tubes 402 when the teeth of the pinions 1903 mesh with the racks 1902.

Figure 20:
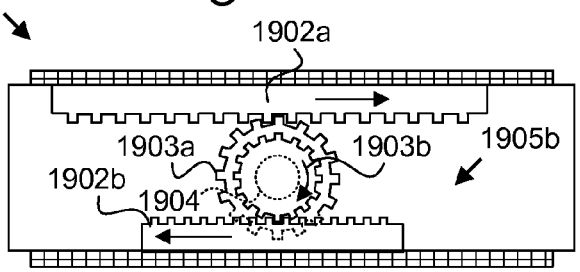
FIG. 20 is a side view of one embodiment of the rack and pinion assemblies of FIG. 19 in accordance with the present invention.

FIG. 20 illustrates in greater detail a side view of the rack and pinion assemblies 1905 of FIG. 19. The front assembly 1905a may be coupled to the front member 412 and configured to extend and retract the front 114 of the trailer 100. The rear assembly 1905b may be coupled to the rear member 414 and configured to extend and retract the back 116 of the trailer 100. The ratio of the front rack 1902a and pinion 1903a compared to the back rack 1902b and pinion 1903b may be configured such that the extension allowed by the front rack 1902a and pinion 1903a is proportionally greater than the extension allowed by the back rack 1902b and pinion 1903b. As a result, the trailer 100 maintains a front distance 118 that is proportionally greater than the rear distance 120.

Figure 21:
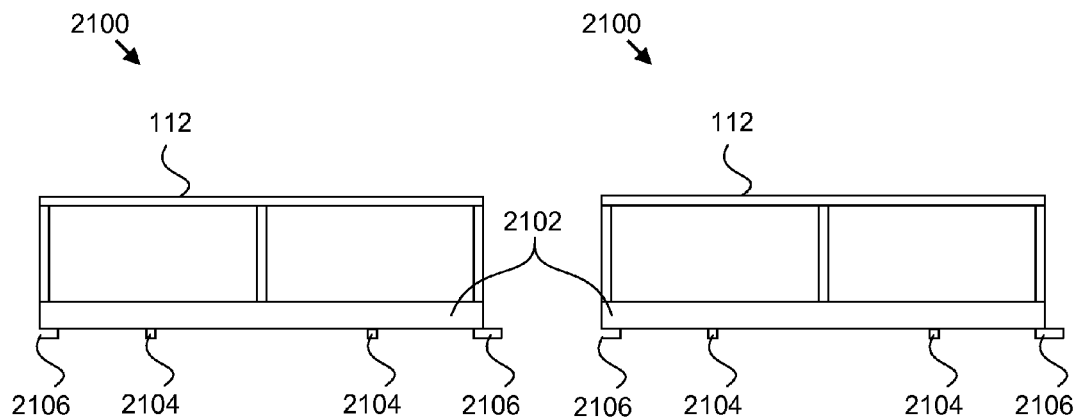
FIG. 21 is a side view of one embodiment of a plurality of supports in accordance with the present invention.

FIG. 21 illustrates one embodiment of supports 2100 that engage the frame 106 and support a load. The supports 2100 as depicted comprise a platform 2102, support members 2104, connectors 2106, and a side rail 112. The supports 2100 may be sized to facilitate the proportional expansion of the frame 106. The length of the support 2100 or the length of a combination of supports 2100 may correspond to the desired expansion 201 distance of the frame 106 in certain embodiments. Alternatively or in addition, the supports 2100 may be added between a front platform and a back platform (See FIG. 22) that are proportionally sized.

The support members 2104, in certain embodiments, engage the frame 106 of the trailer 100 to secure the platform 2102 to the frame 106. In one embodiment, the frame 106 comprises multiple openings to receive the support member 2104. In an alternative embodiment, the support members 2104 rest on top of the frame 106. In certain embodiments, the support members 2104 further enable a support 2100 placed on an extended tube 502, 504 or channel to be evenly aligned with existing supports 2100. The connectors 2106, which may comprise a female receptor and a corresponding male insert, enable the supports 2100 to engage one another. The female receptors and the male inserts may engage each other in a friction fit or securing pins may be used.

In certain embodiments, the supports 2100 function similar to table leaves that expand a leaved table. The connectors 2106 of the supports 2100 may engage a corresponding connector 2106 of a second support 2100 to form a continuous platform 2102 or deck of the trailer 100. In certain embodiments, adding supports enable the trailer 100 to have a continuous platform 2102 in both the compact 101 and expanded positions 200,300. Engaging additional supports 2100 expands the length of the deck, while beneficially maintaining an even load surface.

In certain embodiments, the supports 2100 comprise a platform 2102 made of marine plywood. Alternatively, the supports 2100 may be solid and may be made from wood, plastic, metal, etc. In select embodiments, the platform 2102 maybe perforated and/or meshed. Those of skill in the art will recognize that the supports 2100 and its corresponding components may take on a variety of forms and that the present invention is not limited to the illustrated embodiments.

FIG. 22 illustrates one embodiment of an expandable trailer 100 with a split deck 2200 in accordance with the present invention. In the depicted embodiment, the trailer 100 includes a first support 2100a forming a front platform and a second support 2100b forming a rear platform. The supports 2100 may be removable or fixed to the frame 106. In addition, the supports 2100 may move with the expanding frame 106 to create an opening 2202 in the deck 2200. In one embodiment, the first support 2100a is fastened to the front member 412, and the second support 2100b is fastened to the rear member 414.

The front platform 2100a may be proportionally sized to maintain a front distance 118 that is proportionally greater than the rear distance 120. Similarly, the rear platform 2100b may be sized to maintain a proportional expansion of the trailer 100.

The opening 2202 and/or frame 106 may be configured to receive additional supports 2100c (illustrated in dashed lines) within the opening 2202. Alternatively, the opening 2202 may remain uncovered. In one embodiment, adding additional supports 2100c or inserts facilitate determining a proportional expansion. In one embodiment, the extension mechanism comprises the proportionally sized widths of the front platform 2100a, rear platform 2100b, and additional supports 2100c. In such an embodiment, the frame 106 may extend and retract using conventional extendable devices.

Alternatively, the front platform 2100a, rear platform 2100b, and additional supports 2100c or inserts may have an uniform width. For example, the width may be two feet. Consequently, in a compact position the trailer measures four feet in length 121. Proportional extension of the front relative to the back may be controlled by the extension mechanism 400. To essentially double the length of the trailer 100, a user extends the front and the rear and inserts two additional supports 2100c each of a two foot width. The extension mechanism 400 ensures that the front extends proportionally more than the rear. The user then secures the front and rear in the new extended positions and the trailer 100 now has a length 121 of substantially twice the original length, the new length is eight feet.

Figure 23:
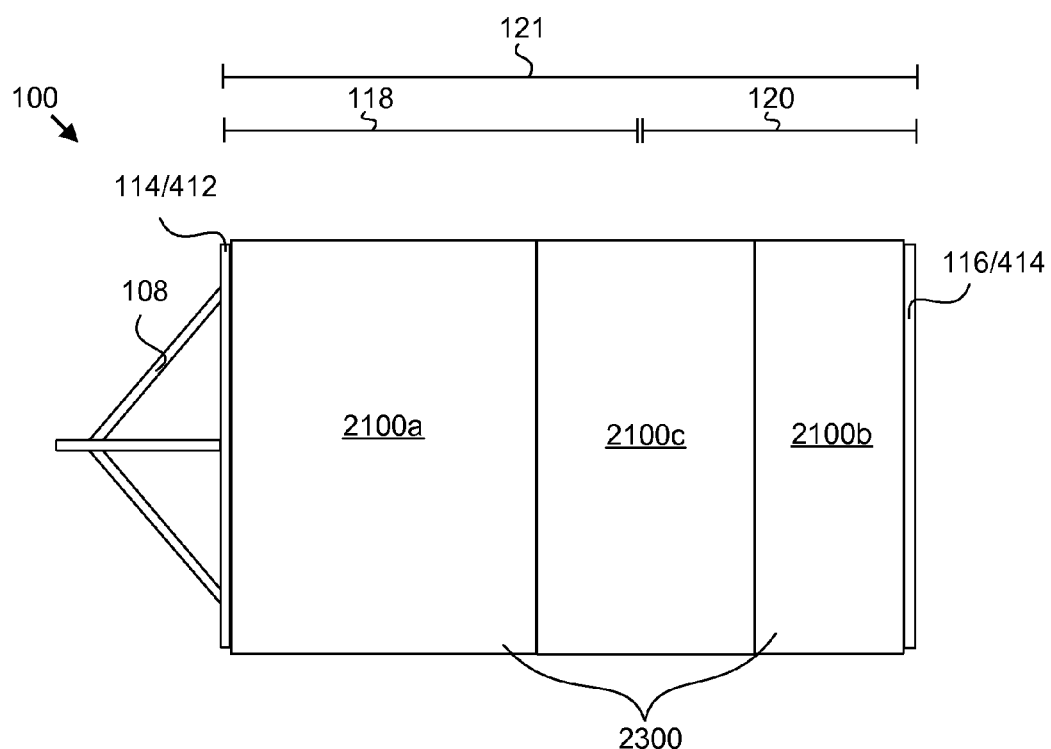
FIG. 23 is a plan view of one embodiment of a continuous platform comprising of supports in accordance with the present invention.

FIG. 23 illustrates a plan view of one embodiment of a continuous platform 2300. The continuous platform 2300 comprises a first support 2100a forming a front platform, a second support 2100b forming a rear platform, and an additional support 2100c inserted between the first support 2100a and the second support 2100b. The support 2100c may include one or more connectors 2106 that engage a corresponding connector 2106 of the other supports 2100a, 2100b. The supports 2100 may facilitate maintaining a proportionally greater front distance 118 than the rear distance 120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An expandable trailer comprising:
    an axle assembly configured to mount a plurality of wheels;
    a frame having a front and a back; and
    an extension mechanism configured to lengthen the frame from a compact position to one of a plurality of extended positions, such that the extension mechanism extends the front of the frame a front distance from the axle assembly and extends the back of the frame a rear distance from the axle assembly, the extension mechanism maintaining a proportionally greater front distance than the rear distance.

2. The trailer of claim 1, wherein the front distance is between about 50 to about 80 percent of a total frame length from the front to the back and the rear distance is between about 20 to about 50 percent of the total frame length.

3. The trailer of claim 1, further comprising one or more supports, each support configured to engage the frame and support a load.

4. The trailer of claim 1, further comprising a securing mechanism configured to selectively secure the frame in one of the compact position and one of the extended positions.

5. The trailer of claim 1, further comprising a linkage configured to simultaneously and proportionally extend and retract the front and the back in response to operation of the extension mechanism.

6. The trailer of claim 5, wherein the linkage is selected from the group consisting of a hydraulic cylinder, a pneumatic cylinder, a rack and pinion, a threaded rod, and a pulley system.

7. The trailer of claim 5, wherein the linkage comprises a plurality of rack and pinion assemblies connected by at least one gear, wherein a first extension allowed by a front rack and pinion is proportionally greater than a second extension allowed by a rear rack and pinion.

8. The trailer of claim 5, wherein the linkage comprises a manual operation mechanism.

9. The trailer of claim 5, further comprising a motor operatively coupled to the linkage.

10. The trailer of claim 1, wherein the frame further comprises a base member, a front member, and a rear member, and wherein the extension mechanism is configured to extend the front member and the rear member from the base member.

11. The trailer of claim 1, wherein the frame further comprises an inner channel and an outer channel configured to telescopically engage each other.

12. The trailer of claim 11, wherein the frame further comprises a bracket and at least one roller support disposed along the outer channel and configured to facilitate extending the front and the back.

13. An expandable trailer comprising:
    an axle assembly configured to mount a plurality of wheels;
    a frame having a front and a back;
    an extension mechanism configured to lengthen the frame from a compact position to one of a plurality of extended positions such that the extension mechanism extends the front of the frame a front distance from the axle assembly and extends the back of the frame a rear distance from the axle assembly, the extension mechanism maintaining a proportionally greater front distance than the rear distance;
    a tongue extending from the front of the frame, the tongue configured to attach the trailer to a vehicle;
    one or more supports secured to the frame to support a load; and
    a securing mechanism configured to selectively secure the frame in one of the compact position and one of the extended positions.

14. The trailer of claim 13, wherein the total frame length from the front to the back in one of the extended positions is substantially twice the total frame length in the compact position.

15. A system for an expandable trailer, the system comprising:
    an expandable trailer comprising,
        an axle assembly configured to mount a plurality of wheels;
        a frame having a front and a back; and
        an extension mechanism configured to lengthen the frame from a compact position to one of a plurality of extended positions, such that the extension mechanism extends the front of the frame a front distance from the axle assembly and extends the back of the frame a rear distance from the axle assembly, the extension mechanism maintaining a proportionally greater front distance than the rear distance;
        simultaneously and proportionally extend and retract the front and the back in response to operation of the extension mechanism; and
    one or more supports configured to engage the frame and support a load.

16. The system of claim 15, wherein each support comprises a connector configured to engage a corresponding connector of a second support to form a continuous platform.

17. The system of claim 15, wherein the one or more supports are proportionally sized to determine a total frame length between the front and the back, wherein the front distance is between about 50 to about 80 percent of the total frame length and the rear distance is between about 20 to about 50 percent of the total frame length.

18. The system of claim 15, further comprising an attachable side rail configured to engage the frame.

19. The system of claim 15, wherein the frame further comprises a storage compartment disposed on the frame for storing the one or more supports during transport.

20. The system of claim 15, wherein a first support is connected to the frame forming a front platform and a second support is connected to the frame forming a rear platform, wherein extending the frame creates an opening between the front platform and the rear platform for receiving one or more additional supports.

21. The system of claim 15, further comprising a front platform connected to the frame between the front and the axle assembly and a rear platform connected to the frame between the axle assembly and the back, the front platform and rear platform fixed in relation to the axle assembly such that activation of the extension mechanism extends the frame to create a first opening between the front and the front platform and a second opening between the back and the rear platform the first opening and second opening sized to receive and secure one or more additional supports.

* * * * *

UNITED STATES PATENT AND TRADEMARK OFFICE
CERTIFICATE OF CORRECTION

| | | |
|---|---|---|
| PATENT NO. | : 7,810,834 B2 | Page 1 of 1 |
| APPLICATION NO. | : 11/421621 | |
| DATED | : October 12, 2010 | |
| INVENTOR(S) | : Stacy L. Schneider and Michael D. Schneider | |

It is certified that error appears in the above-identified patent and that said Letters Patent is hereby corrected as shown below:

Column 14, Line 32 "maybe" should read "may be"

Signed and Sealed this
Eleventh Day of January, 2011

David J. Kappos
*Director of the United States Patent and Trademark Office*